March 6, 1928.

E. R. BURTNETT 1,661,559

INTERNAL COMBUSTION ENGINE

Filed Nov. 5, 1925

INVENTOR,
EVERETT R. BURTNETT.
By Martin Smith, atty.

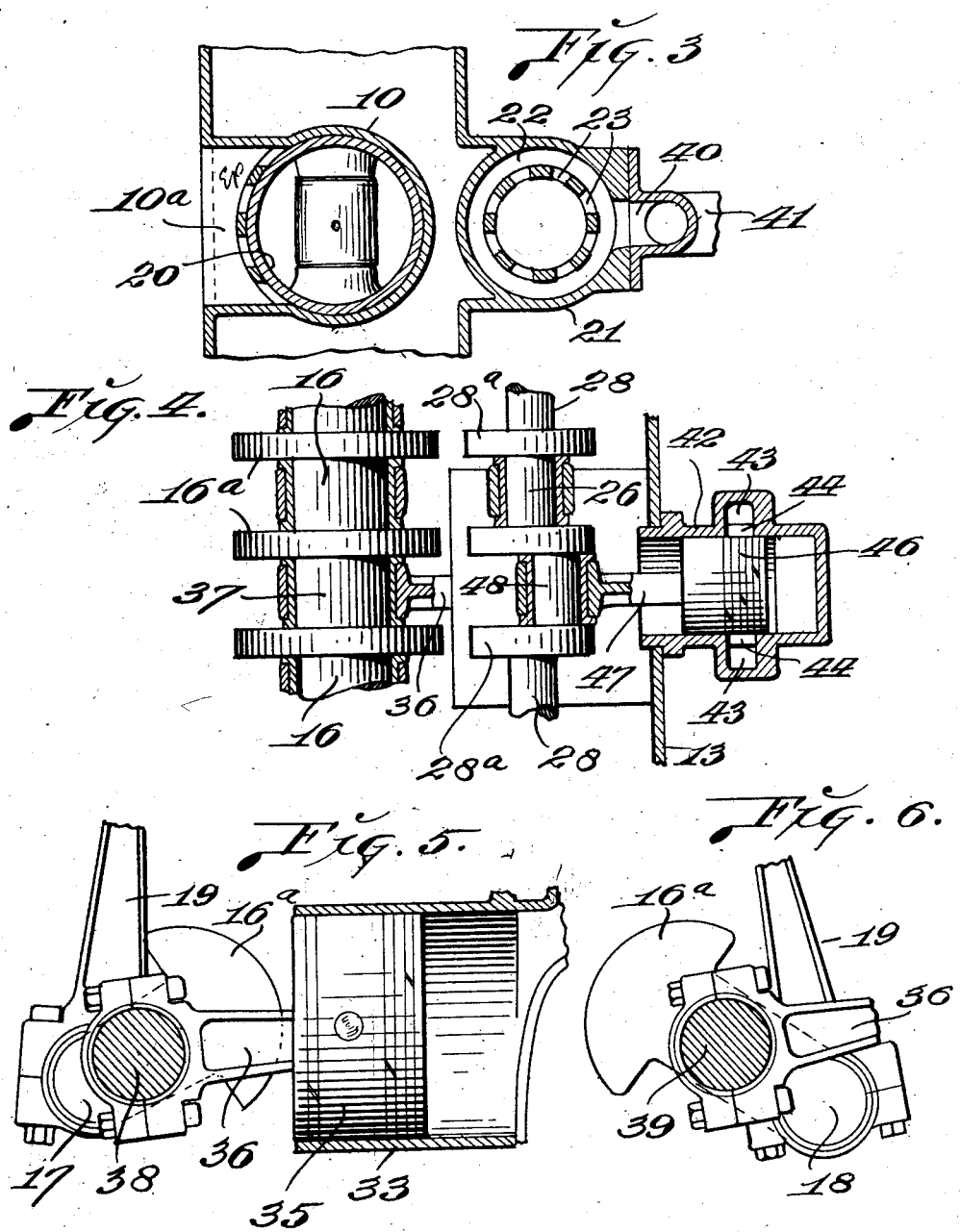

Patented Mar. 6, 1928.

1,661,559

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed November 5, 1925. Serial No. 66,964.

My invention relates to a two stroke cycle internal combustion engine and the structure herein disclosed is an improvement on a somewhat similar engine and which latter is disclosed in my copending application for U. S. Letters Patent filed November 5, 1925, Serial No. 66,962.

It is the object of my present invention to provide a two stroke cycle internal combustion engine unit that includes a piston and mechanical means for admitting a gaseous fuel charge to a fresh charge pump and transferring said charge at the proper time into the combustion chamber of another one of the engine units and to arrange for the scavenging of the combustion chamber during the time of fresh charge induction, said engine also including a series of pistons, cranks and connecting means, and the parts comprising each unit being arranged in one transverse plane, thereby permitting an engine of very great displacement to be constructed within a very short overall length.

The principle of the design, which affords this short length, is the adaptation of a piston valve as a second piston to the combustion chamber, said piston valve being arranged to the side of the main combustion cylinder and likewise to the side of the axis of the crank shaft and the aligned row of main combustion cylinders in combination with a horizontally disposed fresh charge pump. This horizontally disposed fresh charge pump is centered on a line intersecting the axis of the crank shaft and the axis of the fresh charge pump cylinder is spaced 90° from the axis of the main combustion cylinder. It is a further object of my invention, to arrange the piston valve which functions as a fresh fuel charge admission means to the horizontally arranged fresh charge pump cylinder so that its axis is substantially parallel with the axis of said pump cylinder and the two piston valves forming a part of each unit being directly connected to separate crank pins of a small auxiliary crank shaft that is geared to the main crank shaft by any desirable means and necessarily timed to operate at a ratio of one to one, and preferably driven from the main crank shaft.

A further object of my invention is the balance (not the principle of balance) but the reduction of weight, by the use of but one main combustion cylinder and piston, instead of two to each unit. The use of one main combustion cylinder reduces the reciprocating force of the combustion unit to a given piston displacement and power; hence a like reduction of the horizontally disposed pump cylinder weight that functions as a fresh charge pump and a counter inertia weight force on the crank shaft, against the rotary counterbalance weight that is arranged to the crank shaft and related to each unit diametrically opposite the crank pins to which the main vertical combustion cylinder and the horizontally disposed fresh charge pump pistons are connected. This counterweight of the crank shaft is equal in moments inches weight from the axis of the crank shaft, to the total moments inches weight of all of the parts considered as rotary mass and the weight of the reciprocating mass of either the vertical main combustion or horizontal fresh charge pump pistons and parts, considered as the reciprocating mass of a unit. The moments inches weight developed at the respective crank pin axis, and the ratio of the 90° angularly disposed main reciprocating forces being exactly in ratio to the respective stroke of one or the other, in ratio to the other, so that the total moments inches weight concentrated about the axis of the crank shaft is the same in so far as the variation in stroke and reciprocating mass inertia force is concerned.

Since the counterweight of the crank shaft is equal to the constant rotary parts out of center with the axis of the crank shaft and the weight force developed at the crank pins by one of the main reciprocating forces and the arrangement of the two main reciprocating forces 90° apart and with their respective axial lines of the main reciprocating masses intersecting the crank shaft axis, then a constant reciprocating force is developed at the crank pins of a constant moments inches weight from the axis of the crank shaft.

Thus, the rotary and reciprocatory forces that tend to put a given unit of the crank shaft out of balance are put in balance, by the counterweight of the crank shaft of each unit and the less the weight of the main combustion piston or reciprocative mass, the less the counterweight need be, and likewise the less the horizontally disposed reciprocating mass of the fresh charge pump need be.

With the foregoing and other objects in view, my invention consists in certain novel features of construction and arrangement of parts that will be hereinafter more fully described and claimed and illustrated in the accompanying drawings in which Fig. 1 is a vertical transverse section taken through the center of an engine unit of my improved construction.

Fig. 3 is a horizontal section taken approximately on the line 3—3 of Fig. 1.

Fig. 4 is a horizontal section taken approximately on the line 4—4 of Fig. 1.

Fig. 5 is a detail section taken approximately on the line 5—5 of Fig. 2.

Fig. 6 is a detail section taken approximately on the line 6—6 of Fig. 2.

Figure 1:
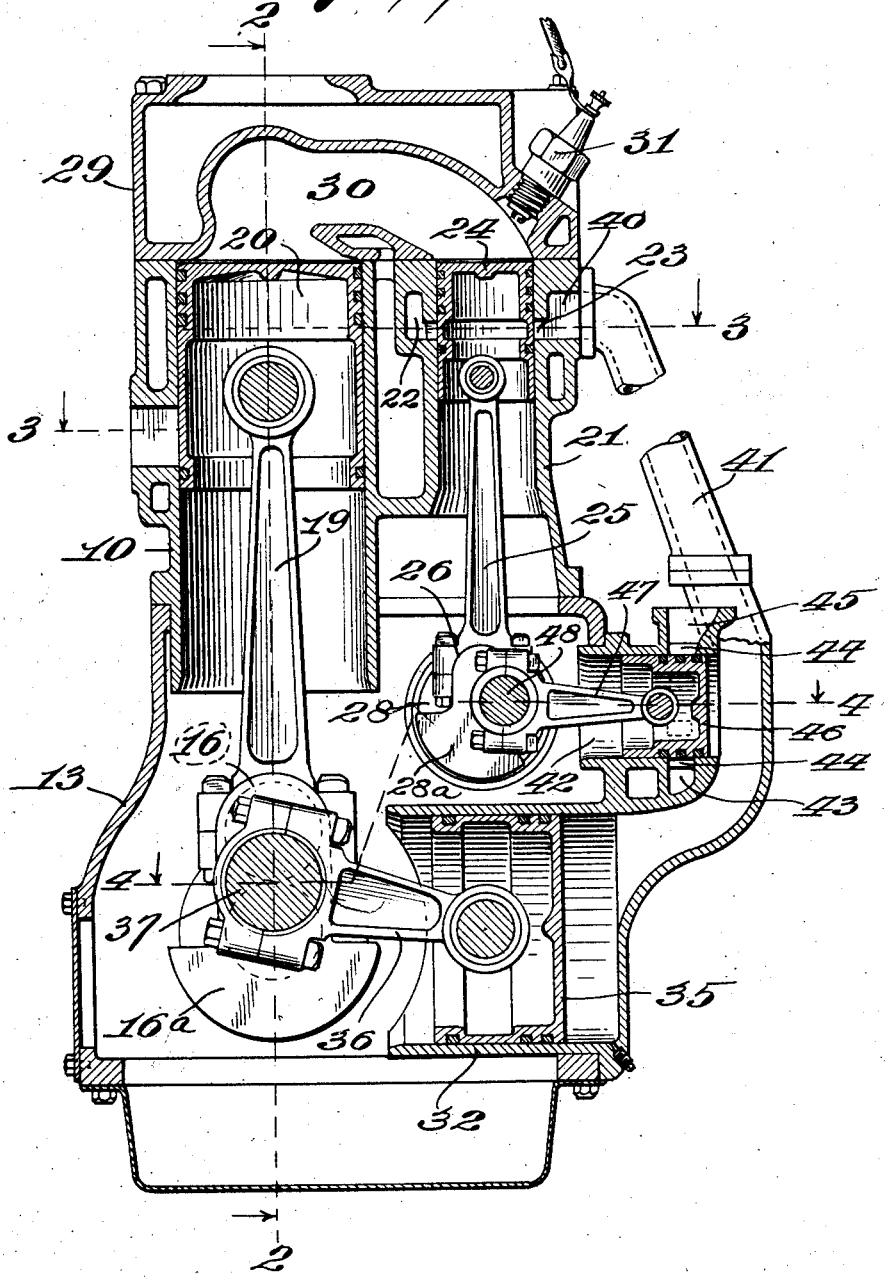
Figure 2:
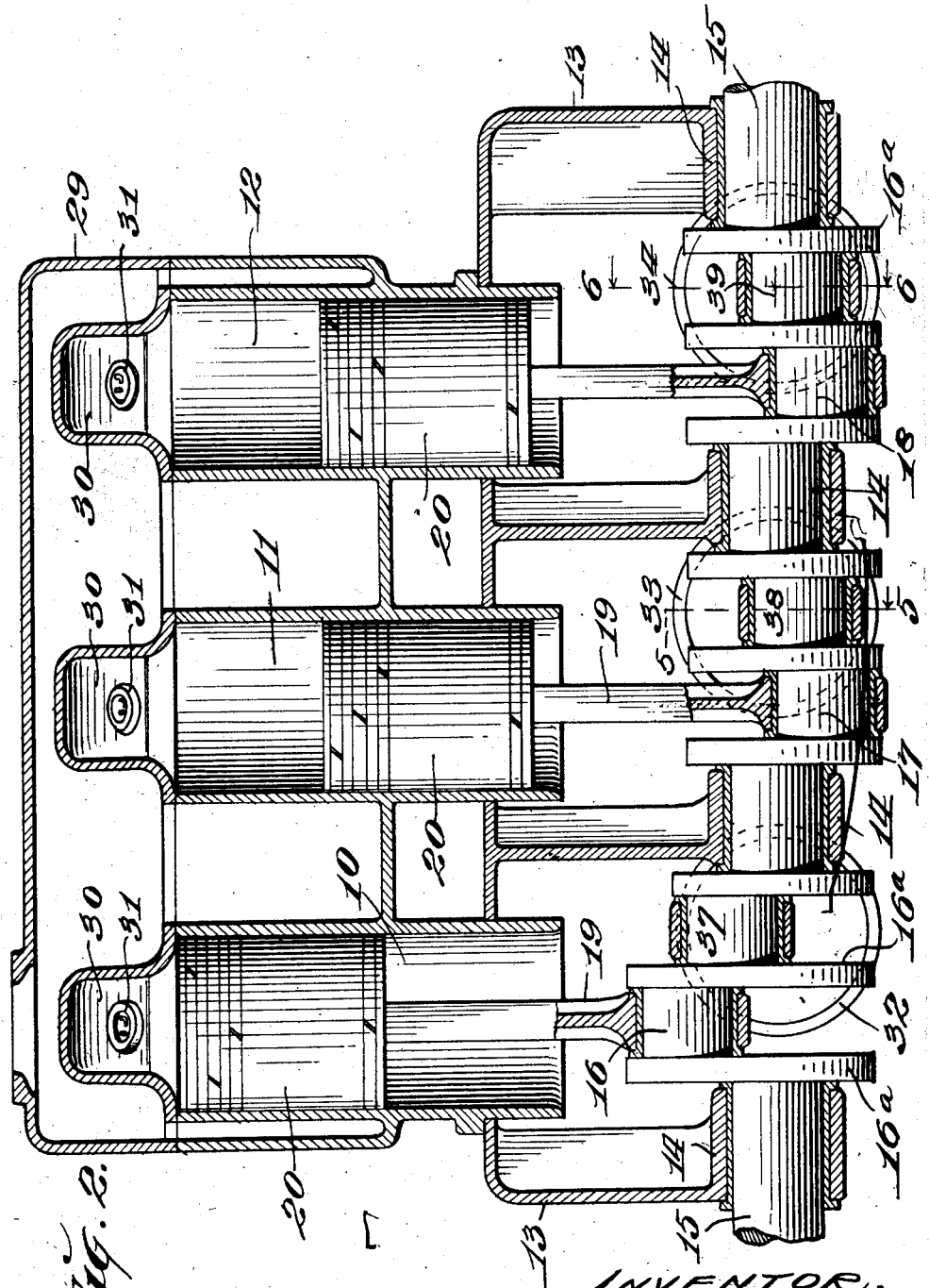
Fig. 2 is a vertical longitudinal section taken on the line 2—2 of Fig. 1.

Referring by numerals to the accompanying drawings, 10, 11 and 12 designate three combustion cylinders of equal size, that are arranged in row, with their axes parallel, said cylinders surmounting a crank case 13, and the latter having four main bearings 14 for a crank shaft 15. This crank shaft is provided with three cranks or throws 16, 17 and 18 that are located respectively, in alignment with the axes of cylinders 10, 11 and 12. These three cranks are disposed 120° apart circumferentially of the crank shaft axis and each crank is connected by an ordinary connecting rod, such as 19, to a conventional power piston, such as 20, that is arranged for reciprocatory movement within the corresponding one of the combustion cylinders.

Disposed immediately adjacent each combustion cylinder and laterally thereof, is a piston valve cylinder, such as 21 and formed in the upper portion of the wall of each valve cylinder is an annular chamber 22 that has communication through ports 23 with the chamber in the respective valve cylinder.

A piston valve such as 24 is arranged for operation in each valve cylinder 21, for controlling the passage of charge volumes through the corresponding ports 23 and each piston valve is connected by a connecting rod, such as 25, to a respective throw or eccentric, such as 26 that is formed on an auxiliary shaft 28. This shaft operates at "engine speed" or the speed of crank shaft 15 and said shaft 28 is preferably driven by suitable gearing or driving mechanism, directly from said crank shaft.

Shaft 28 lies parallel with shaft 15 and mounted in suitable bearings in the upper portion of crank case 13, just below the valve cylinders 21.

Each combustion cylinder is provided with an exhaust port, such as 10ª, the same being located at a point where it will be uncovered and open only when the piston within said chamber is at the lower outer end of its stroke.

Secured to the head ends of the cylinders 10, 11 and 12, is a head block 29 and formed therein are three separate transversely disposed chambers such as 30, that connect the head or inner ends of the respective combustion chambers with the head or inner ends of the corresponding piston valve chambers. These chambers 30 function as common compression and combustion clearance chambers for the respective pairs of combustion and piston valve chambers.

Seated in the head 29, above each piston valve chamber is an ignition device such as a spark plug 31.

Arranged in the lower portion of crank case 13 are three charge volume pump cylinders 32 (Fig. 1), 33 and 34 that are paired respectively with the combustion cylinders 10, 11 and 12. These pump cylinders are disposed at right angles or 90° relative to the combustion cylinders and the axes of said pump cylinders are slightly offset longitudinally of the engine structure with respect to the axes of the corresponding combustion cylinders.

Arranged for reciprocatory movement within the pump cylinders such as 35 and the latter are connected respectively, by connecting rods such as 36, to three throws 37, 38 and 39 of crank shaft 15.

Cranks or throws 37, 38 and 39 are positioned adjacent the cranks 16, 17 and 18 respectively and in the same radial planes therewith, and thus said three throws 37, 38 and 39 occupy angular positions 120° apart.

The radii of the throws 37, 38 and 39 are in length equal to each other, but they are somewhat less than the radii of the throws 16, 17 and 18, consequently the stroke of the pumping pistons 35 is shorter than the stroke of the power pistons 20.

Leading from the outer end of each pump cylinder to an inlet port such as 40 that communicates with the annular chamber 23 of one of the piston valve cylinders 21, is a charge volume transfer duct such as 41, and the arrangement of these ducts is such, that the duct from the pump cylinder of one of the power units of the engine, leads to the piston valve cylinder of another unit.

As a result, the three pumps function in proper time relation to the strokes of the pistons in the three combustion cylinders.

Arranged directly above each pump cylinder is a horizontally disposed piston valve cylinder such as 42, the outer end thereof having direct communication with the corresponding duct 41, and formed in the outer portion of the wall of said cylinder is an annular chamber 43 that communicates through ports 44 with the chamber within the valve cylinder.

A charge volume inlet port 45 that is connected to a suitable source of supply leads into annular chamber 43.

Arranged for reciprocatory movement in each valve cylinder 42 is a piston valve, such as 46 that is connected by a connecting rod such as 47 to a throw or eccentric 48 on an auxiliary shaft 28.

Obviously, there are three of these throws or eccentrics 48 and they are located on shaft 28 adjacent the three throws or eccentrics and each throw or eccentric 48 is disposed at right angles or 90° from its adjacent throw or eccentric 26. (See Figs. 1 and 4).

The operation of my improved engine is as follows:

Each power piston 20 and the adjacent or companion piston valve 24 have the same stroke time, that is, they move in the same direction at the same time, and as one pair of said pistons reach top center, a charge volume previously admitted past the piston valve will be compressed in common clearance chamber 30. At the point of highest compression, the compressed charge is ignited by a spark produced between the inner ends of the electrodes of the corresponding plug 31 and the rise in pressure following combustion of the charge will act on the heads of the pistons to drive same outward on their power stroke, particularly power piston 20.

As the head end of piston 20 moves below and uncovers exhaust port 10$^a$, the products of combustion will discharge through said exhaust port, and this action is accelerated by the inrush of gaseous fuel that is forced by the pump of another one of the engine units through the corresponding duct 41, inlet port 40, chamber 22, ports 23 (the latter being uncovered when valve 24 passes below them) and duct 30.

On the succeeding upward stroke of the pistons 20 and 24, exhaust ports 10$^a$ and inlet ports 23 will be closed and the charge volume admitted to common clearance chamber 30 as just described, will be compressed therein.

The cranks or eccentrics 48 to which piston valves 46 are connected are positioned with respect to the cranks 37, 38 and 39, to which the pumping pistons 35 are connected, so that as one of the pumping pistons moves outwardly on its suction stroke, the corresponding piston valve 46 will be drawn outwardly to uncover and open the ports 44, thereby admitting to the piston valve chamber 42, lower portion of duct 41 and pump chamber, a charge volume, which latter enters through ports 45, 44 and 43.

On the inward stroke of the piston valve 46, the ports 44 are closed slightly in advance of the forward stroke of the corresponding pump piston and as the latter moves inward, the charge volume drawn into the pump chamber will be forced through duct 41 into the corresponding one of the annular chambers 22 and to discharge therefrom through ports 23 into the corresponding chamber 30 as the corresponding piston valve 24 uncovers said ports 23.

Main crank shaft 16 and auxiliary crank shaft 28 are suitably counterbalanced, preferably by weights such as 16$^a$ and 28$^a$ respectively; the latter being preferably arranged on the ends of the crank arms opposite the crank pins.

Thus it will be seen that I have provided a relatively simple and efficient multiple unit, two stroke cycle internal combustion engine, that has relatively short overall length and each unit comprising a main power cylinder, a pump cylinder and a pair of piston valves; said pump, in addition to functioning as a fresh charge volume pump serving as a counter inertia weight force, one piston valve controlling the inlet of charge volumes into the pump and the other piston valve controlling the inlet of the pumped charge volume into the combustion chamber.

It will be understood that minor changes in the size, form and construction of the various parts of my improved internal combustion engine may be made and substituted for those herein shown and described without departing from the spirit of the invention, the scope of which is set forth in the appended claims.

I claim as my invention:

1. In a two stroke cycle internal combustion engine, a power unit comprising a combustion cylinder, a charge volume pump occupying a plane 90° from the plane occupied by the combustion cylinder, pistons arranged for operation within the combustion cylinder and the cylinder of said pump, a crank shaft to which said pistons are connected, a piston valve for controlling the admission of a fresh fuel charge to the pump, a separate piston valve for controlling the admission of a pumped charge volume to the chamber within the combustion cylinder and an auxiliary shaft adapted to operate at the same speed as said crank shaft for actuating said piston valves.

2. The combination, in a two stroke cycle internal combustion engine unit of four cylinders, pistons within the four cylinders, two crank shafts, the axes of the two crank shafts being parallel, the axes of the four cylinders comprising one unit occupying approximately, one transverse plane, the axes of the two cylinders intersecting the axis of one of the said two crank shafts, and the axes of the other two cylinders of the unit of four cylinders intersecting the axis of the other crank shaft, and each pair of cylinders with both axes intersecting either one of the two crank shafts being arranged with their axes relative to the axis of the crankshaft to which their axial lines intersect 90° apart, the stroke travel distance within the pair of cylinders with axes intersecting a given crank shaft, being greater than the stroke travel distance of the pistons within the other pair of cylinders with axes intersecting the other of the two crank shafts, a common cylinder head clearance chamber joining the cylinder chambers of each pair of cylinders having parallel axes, there being ports formed in the cylinder walls of three of the four cylinders, a positive driving connection joining the two crank shafts in one to one rotation time relation, counterweights of the crank shafts arranged diametrically opposite the axis of the total weight of the pair of crank pins of each of the two crank shafts, and ignition means located in the wall of the cylinder head clearance chamber joining one pair of cylinders.

In testimony whereof I affix my signature.

EVERETT R. BURTNETT.